(12) United States Patent
Ning et al.

(10) Patent No.: US 12,047,014 B2
(45) Date of Patent: Jul. 23, 2024

(54) THREE-PHASE INVERTER CONTROL SYSTEM AND THREE-PHASE INVERTER CONTROL METHOD

(71) Applicant: SANTAK ELECTRONIC (SHENZHEN) CO., LTD., Shenzhen (CN)

(72) Inventors: Huahong Ning, Shenzhen (CN); Dengke Zhang, Shenzhen (CN); Hualiang Li, Shenzhen (CN); Dawei Zheng, Shenzhen (CN)

(73) Assignee: Santak Electronic (Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 17/818,544

(22) Filed: Aug. 9, 2022

(65) Prior Publication Data
US 2023/0052807 A1 Feb. 16, 2023

(30) Foreign Application Priority Data
Aug. 9, 2021 (CN) .......................... 202110906253.5

(51) Int. Cl.
H02M 7/538 (2007.01)
H02M 7/493 (2007.01)
H02M 7/5387 (2007.01)

(52) U.S. Cl.
CPC ....... *H02M 7/53871* (2013.01); *H02M 7/493* (2013.01); *H02M 7/53873* (2013.01)

(58) Field of Classification Search
CPC ......... H02M 7/53871; H02M 7/53873; H02M 7/493
See application file for complete search history.

(56) References Cited

U.S. PATENT DOCUMENTS

| 3,675,037 | A  | * | 7/1972  | Hamilton | H02M 7/493 |
|           |    |   |         |          | 363/71     |
| 5,345,377 | A  | * | 9/1994  | Edwards  | G05F 1/70  |
|           |    |   |         |          | 363/40     |
| 7,920,033 | B1 | * | 4/2011  | Groe     | H03C 3/0925|
|           |    |   |         |          | 332/127    |
| 9,184,687 | B2 | * | 11/2015 | Handa    | H02P 21/06 |
| 9,341,660 | B2 | * | 5/2016  | Wu       | H02M 7/53873|
| 9,450,528 | B2 | * | 9/2016  | Yasui    | H02P 21/00 |

(Continued)

*Primary Examiner* — Yusef A Ahmed
(74) *Attorney, Agent, or Firm* — Stanek Lemon Crouse & Meeks, PA (57) ABSTRACT

A control system for a three-phase inverter includes an instantaneous value voltage controller and an equivalent effective value voltage controller. The instantaneous value voltage controller is configured to feed back and control an instantaneous value of an inverter output voltage. The equivalent 5 effective value voltage controller is configured to perform an orthogonal decomposition feedback control on an effective value of the inverter output voltage. The equivalent effective value voltage controller is configured to perform integral compensation respectively on a real-axis voltage and an imaginary-axis voltage of a two-phase rotating coordinate system of the three-phase inverter. An output of the instantaneous value 10 voltage controller and an output of the equivalent effective value voltage controller are used to obtain the inverter output voltage through a delay stage transfer function and a controlled object transfer function.

14 Claims, 8 Drawing Sheets

(56) References Cited

U.S. PATENT DOCUMENTS

| | | | |
|---|---|---|---|
| 10,873,273 B2* | 12/2020 | Lee | H02M 7/53871 |
| 11,444,558 B1* | 9/2022 | Latham | H02P 21/141 |
| 2004/0052217 A1* | 3/2004 | Anghel | H02P 9/009 |
| | | | 370/254 |
| 2004/0071000 A1* | 4/2004 | Escobar | H02J 3/01 |
| | | | 363/63 |
| 2005/0063205 A1* | 3/2005 | Stancu | H02M 7/53875 |
| | | | 363/132 |
| 2008/0157710 A1* | 7/2008 | Tobari | H02P 21/22 |
| | | | 318/807 |
| 2009/0231893 A1* | 9/2009 | Esmaili | H02M 7/53871 |
| | | | 363/79 |
| 2010/0131219 A1* | 5/2010 | Kenly | G01R 19/0092 |
| | | | 702/64 |
| 2010/0237821 A1* | 9/2010 | Kitanaka | H02P 21/05 |
| | | | 318/702 |
| 2011/0122661 A1* | 5/2011 | Sakakibara | H02P 29/50 |
| | | | 363/37 |
| 2011/0130889 A1* | 6/2011 | Khajehoddin | G05F 1/70 |
| | | | 700/298 |
| 2013/0082636 A1* | 4/2013 | Ohori | H02P 21/00 |
| | | | 363/41 |
| 2013/0181654 A1* | 7/2013 | Rozman | H02M 5/4585 |
| | | | 318/721 |
| 2013/0279213 A1* | 10/2013 | Saeki | H02M 5/4585 |
| | | | 363/125 |
| 2014/0152110 A1* | 6/2014 | Sugimoto | H02J 4/00 |
| | | | 307/66 |
| 2014/0197774 A1* | 7/2014 | Liu | H02M 1/126 |
| | | | 363/40 |
| 2014/0268957 A1* | 9/2014 | Khajehoddin | H02J 3/1842 |
| | | | 363/95 |
| 2014/0328091 A1* | 11/2014 | Sakakibara | H02M 1/15 |
| | | | 363/37 |
| 2014/0333241 A1* | 11/2014 | Zhao | H02P 27/08 |
| | | | 318/400.02 |
| 2015/0092462 A1* | 4/2015 | Ohori | H02J 3/48 |
| | | | 363/71 |
| 2015/0123579 A1* | 5/2015 | Liu | H02P 21/06 |
| | | | 318/400.05 |
| 2015/0171772 A1* | 6/2015 | Tallam | H02M 7/53871 |
| | | | 363/41 |
| 2015/0214867 A1* | 7/2015 | Takahashi | H02P 21/50 |
| | | | 318/400.02 |
| 2016/0094149 A1* | 3/2016 | Pahlevaninezhad | |
| | | | H02M 7/53871 |
| | | | 363/97 |
| 2016/0156291 A1* | 6/2016 | Becker | H02P 21/30 |
| | | | 318/400.26 |
| 2016/0173012 A1* | 6/2016 | Nondahl | H02P 6/08 |
| | | | 318/400.34 |
| 2016/0233782 A1* | 8/2016 | Sakakibara | H02M 1/42 |
| 2016/0336750 A1* | 11/2016 | Oates | H02M 7/48 |
| 2016/0373025 A1* | 12/2016 | Mascioli | H02J 3/381 |
| 2016/0373125 A1* | 12/2016 | Pagnanelli | H03M 3/436 |
| 2017/0047862 A1* | 2/2017 | Luo | H02M 7/53871 |
| 2018/0054139 A1* | 2/2018 | Huang | H02M 1/14 |
| 2018/0123479 A1* | 5/2018 | Sanfelice | H02M 7/53871 |
| 2018/0316297 A1* | 11/2018 | Uemura | H02P 6/06 |
| 2018/0358907 A1* | 12/2018 | Kato | H02M 7/53875 |
| 2019/0214918 A1* | 7/2019 | Kawamura | H02J 9/062 |
| 2019/0222135 A1* | 7/2019 | Sakakibara | H02M 1/4225 |
| 2019/0245458 A1* | 8/2019 | Wang | H02M 7/4826 |
| 2020/0021214 A1* | 1/2020 | Lakshmi Narasimha | |
| | | | H02P 21/14 |
| 2020/0335978 A1* | 10/2020 | Ren | H02J 3/24 |
| 2020/0343731 A1* | 10/2020 | Hassan | H02M 7/493 |
| 2021/0067054 A1* | 3/2021 | Tanaka | H02M 5/4585 |
| 2021/0103258 A1* | 4/2021 | Fujimoto | G05B 13/048 |
| 2021/0143752 A1* | 5/2021 | Zhang | H02M 3/156 |
| 2021/0281154 A1* | 9/2021 | Xu | H02P 27/08 |
| 2021/0399648 A1* | 12/2021 | McCartney | G01R 19/2513 |
| 2022/0052620 A1* | 2/2022 | Du | H02M 1/0043 |
| 2022/0077688 A1* | 3/2022 | Patarroyo | H02J 3/46 |
| 2022/0190741 A1* | 6/2022 | Katoh | H02M 7/5395 |
| 2022/0399801 A1* | 12/2022 | Suzuki | H02M 1/0012 |
| 2023/0170826 A1* | 6/2023 | Kawai | H02M 7/53871 |
| | | | 363/41 |
| 2023/0208318 A1* | 6/2023 | Chen | H02M 1/14 |
| | | | 363/166 |

\* cited by examiner

THREE-PHASE INVERTER CONTROL SYSTEM AND THREE-PHASE INVERTER CONTROL METHOD

CROSS-REFERENCE TO RELATED APPLICATIONS

The present application claims priority to Chinese Patent Application No. 202110906253.5; Filed Aug. 9, 2021, entitled THREE-PHASE INVERTER CONTROL SYSTEM AND THREE-PHASE INVERTER CONTROL METHOD that is incorporated herein by reference in its entirety.

TECHNICAL FIELD

The present invention belongs to the field of inverters, and in particular relates to a control system and a control method for a three-phase inverter.

BACKGROUND

An inverter is a converter that converts DC electric energy of battery, storage battery, and the like into constant-frequency and constant-voltage AC or variable-frequency and variable-voltage AC. With the rapid development of science and technology, people's life and production have higher and higher requirements for power supply quality. An inverter is a core part of power supply equipment such as an uninterruptible power supply (UPS), an AC power frequency converter, or a new energy supply system. Therefore, research on inverters is of great significance to the development of modern industry. In an existing inverter control system, the quality of an inverter output waveform may deteriorate or even lead to system instability due to the presence of nonlinear factors. In an existing inverter control method, feedback control is performed directly by current or voltage, which has slow response speed and poor stability.

SUMMARY

Therefore, an objective of the present invention is to overcome the foregoing deficiencies in the prior art, and provide a control system for a three-phase inverter, which comprises an instantaneous value voltage controller and an equivalent effective value voltage controller, wherein the instantaneous value voltage controller is configured to feed back and control an instantaneous value of an inverter output voltage, the equivalent effective value voltage controller is configured to perform an orthogonal decomposition feedback control on an effective value of the inverter output voltage, and wherein the equivalent effective value voltage controller is configured to perform integral compensation respectively on a real-axis voltage and an imaginary-axis voltage of a two-phase rotating coordinate system of the three-phase inverter, and an output of the instantaneous value voltage controller and an output of the equivalent effective value voltage controller are used to obtain the inverter output voltage through a delay stage transfer function and a controlled object transfer function.

Preferably, the equivalent effective value voltage controller is an integral compensator $$D_{ri}(s) = K_{comp}\frac{1}{s},$$

where $K_{comp}$ is a gain coefficient, and s is a frequency domain operator.

Preferably, the gain coefficient is less than 1.

Preferably, the real-axis voltage is represented as $v_r$, and the imaginary-axis voltage is represented as $v_i$, wherein $$\begin{cases} v_r = v_{ref\_sin} \times v_{err} \\ v_i = v_{ref\_cos} \times v_{err} \end{cases},$$

where $v_{ref\_sin}$ represents an inverter sine voltage given value, $v_{ref\_cos}$ represents an inverter cosine voltage given value, and $v_{err}$ represents a difference between the inverter sine voltage given value and the inverter output voltage.

Preferably, $$\begin{cases} v_r = V_r + \hat{v}_r \\ v_i = V_i + \hat{v}_i \end{cases},$$

where $V_r$ is a real-axis voltage average value, $V_i$ is an imaginary-axis voltage average value, $\hat{v}_r$ is a real-axis voltage disturbance value, and $\hat{v}_i$ is an imaginary-axis voltage disturbance value.

Preferably, $$\begin{cases} V_r = \frac{1}{2}\Delta V_{rms} \\ \hat{v}_r = -\frac{1}{2}\Delta V_{rms}\cos(2wt) \end{cases},$$

and $$\begin{cases} V_i = 0 \\ \hat{v}_i = \frac{1}{2}\Delta V_{rms}\sin(2wt) \end{cases},$$

where $\Delta V_{rms}$ is a difference between a given inverter voltage effective value and a feedback voltage effective value, w is an angular frequency of the inverter output voltage, and t is time.

Preferably, the integral compensator is configured to convert the real-axis voltage $v_r$ into a controller real-axis output value $V_{re}$, and convert the imaginary-axis voltage $v_i$ into a controller imaginary-axis output value $V_{im}$, wherein $$\begin{cases} V_{re} \approx \left(K_{comp}\frac{1}{s}\right)V_r = \left(K_{comp}\frac{1}{s}\right)\frac{1}{2}\Delta V_{rms} \\ V_{im} \approx \left(K_{comp}\frac{1}{s}\right)V_i - 0 \end{cases}.$$

Preferably, a duty cycle $d_d$ of an output of an equivalent real-axis voltage loop is obtained based on the controller real-axis output value $V_{re}$, a duty cycle $d_q$ of an output of an equivalent imaginary-axis voltage loop is obtained based on the controller imaginary-axis output value $V_{im}$, a duty cycle of an output of the instantaneous value voltage controller $D_v(s)$ is $d_{Dv}$, and a total duty cycle is d, where $d=d_{Dv}+d_d+d_q$.

Preferably, the total duty cycle d is used to obtain the inverter output voltage through the delay stage transfer function and the controlled object transfer function.

Preferably, the instantaneous value voltage controller is a hysteresis controller and represented as $$D_v(s) = K_{fw} \frac{s+z}{s+p},$$

where $K_{fw}$ is a gain coefficient of the instantaneous value voltage controller, z is a zero point of an instantaneous voltage loop controller, p is a pole of the instantaneous voltage loop controller, and s is the frequency domain operator.

Preferably, the control system further comprises a coordinate system conversion part which is configured to implement conversion between an abc coordinate system and an αβγ coordinate system.

The present invention further provides a control method for a three-phase inverter, comprising:
  a step of feeding back and controlling an instantaneous value of an inverter output voltage;
  a step of performing orthogonal decomposition feedback control on an effective value of the inverter output voltage, which comprises performing integral compensation on a real-axis voltage and an imaginary-axis voltage of a two-phase rotating coordinate system of the three-phase inverter; and
  an output of the step of feeding back and controlling an instantaneous value of an inverter output voltage and an output of the step of performing orthogonal decomposition feedback control on an effective value of the inverter output voltage are used to obtain the inverter output voltage through delay stage transfer and controlled object transfer.

Preferably, a gain coefficient of the integral compensation is less than 1.

Preferably, the real-axis voltage is represented as $v_r$, and the imaginary-axis voltage is represented as $v_i$, where $$\begin{cases} v_r = v_{ref\_sin} \times v_{err} \\ v_i = v_{ref\_cos} \times v_{err} \end{cases},$$

where $v_{ref\_sin}$ represents an inverter sine voltage given value, $v_{ref\_cos}$ represents an inverter cosine voltage given value, and $v_{err}$ represents a difference between the inverter sine voltage given value and the inverter output voltage.

Preferably, the method further includes converting an abc coordinate system into an αβγ coordinate system in a feedback process and converting the αβγ coordinate system into the abc coordinate system in an output process.

Preferably, the method further includes a step of adjusting an initial phase angle of the inverter output voltage to zero.

Compared with the prior art, the advantages of the present invention lie in that compared with a conventional control system, in an equivalent effective value voltage control loop, a relatively large crossover frequency can be designed, so that sufficiently fast regulating speed is ensured, and there are still sufficient phase and gain margins. In addition, an integral controller in the system ensures stability and almost has no net difference, thereby providing excellent performance in dynamic status/stability.

BRIEF DESCRIPTION OF DRAWINGS

Embodiments of the present invention are further described below with reference to the accompanying drawings, in which.

DETAILED DESCRIPTION

In order to make the objectives, technical solutions, and advantages of the present invention more clear, the present invention is further described below in detail with reference to the accompanying drawings and specific embodiments. It should be understood that the specific embodiments described herein are only used to explain the present invention, but not to limit the present invention.

Figure 1:
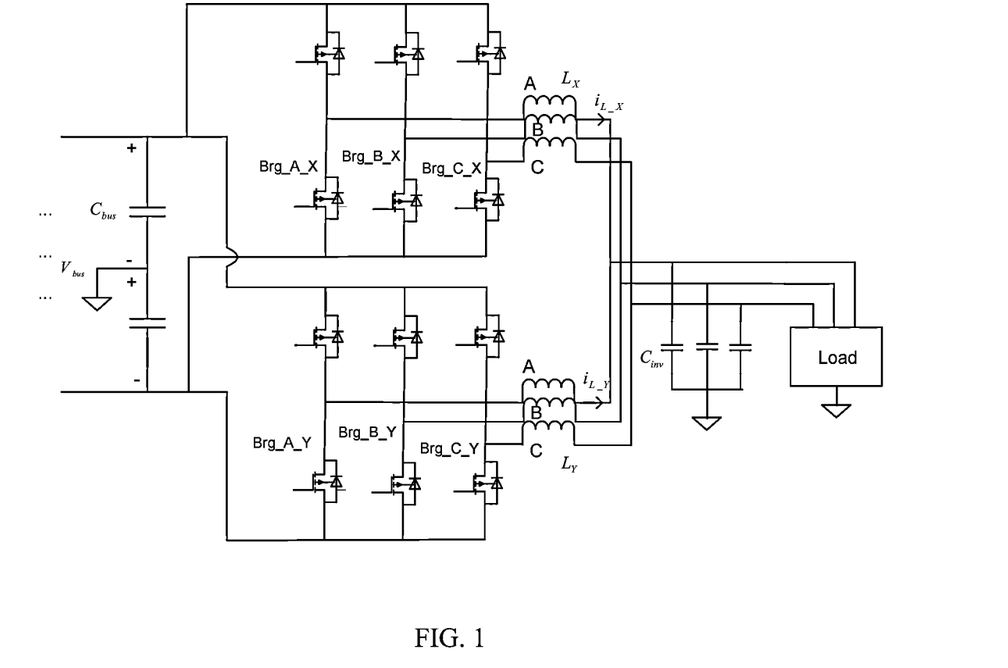
FIG. 1 and FIG. 2 respectively show a three-phase four-wire inverter topology and a three-phase three-wire inverter topology.
Figure 2:
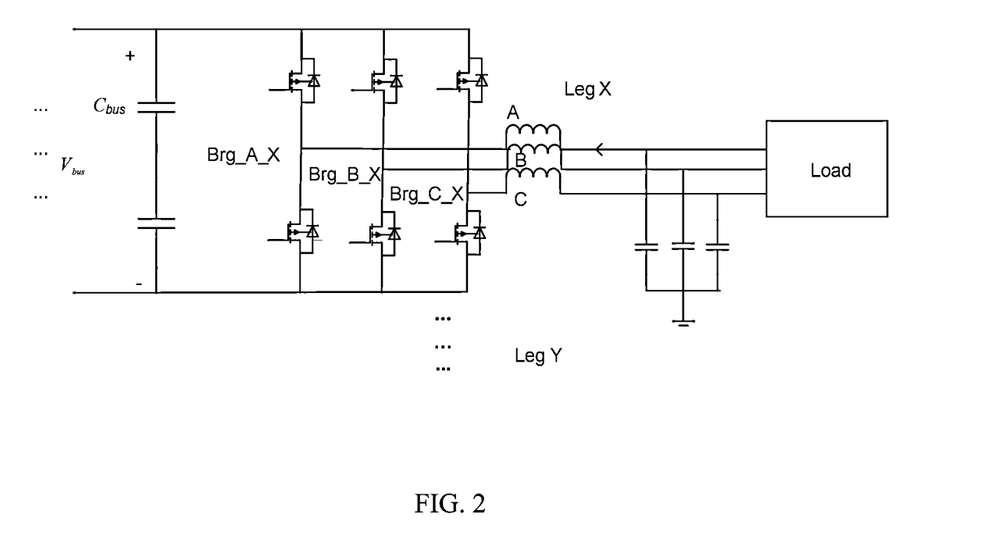

FIG. 1 and FIG. 2 respectively show a three-phase four-wire inverter topology and a three-phase three-wire inverter topology. A power supply voltage supplies power to a load through an inverter topology. $C_{bus}$ represents a bus capacitor of a single side busbar. $V_{bus}$ represents a voltage of the bus capacitor. Brg_A_X/Brg_A_Y, Brg_B_X/BrgB_Y, and Brg_C_X/Brg_C_Y respectively represent inverter X and Y bridge arms of phases A, B, and C. $L_X$ and $L_Y$ respectively represent filter inductors of the inverter X bridge arm and Y bridge arm; $i_{L\_X}$ and $i_{L\_Y}$ respectively represent currents of the filter inductors of the inverter X bridge arm and Y bridge arm; $C_{inv}$ represents an inverter filter capacitor; and LegX and LegY respectively represent an X bridge arm and a Y bridge arm of a three-phase inverter.

First Embodiment

In this embodiment, a control system and a control method for an inverter of the present invention are provided based on the three-phase four-wire inverter topology shown in FIG. 1. A control object of the control system and control method in this embodiment is the three-phase four-wire inverter topology shown in FIG. 1. For simplicity, a phase A is only used as an example for discussion. Those skilled in the art can understand that the cases of phases B and C are similar to the case of the phase A. ABC and abc herein are both used for representing three phases of the three-phase inverter.

Figure 3:
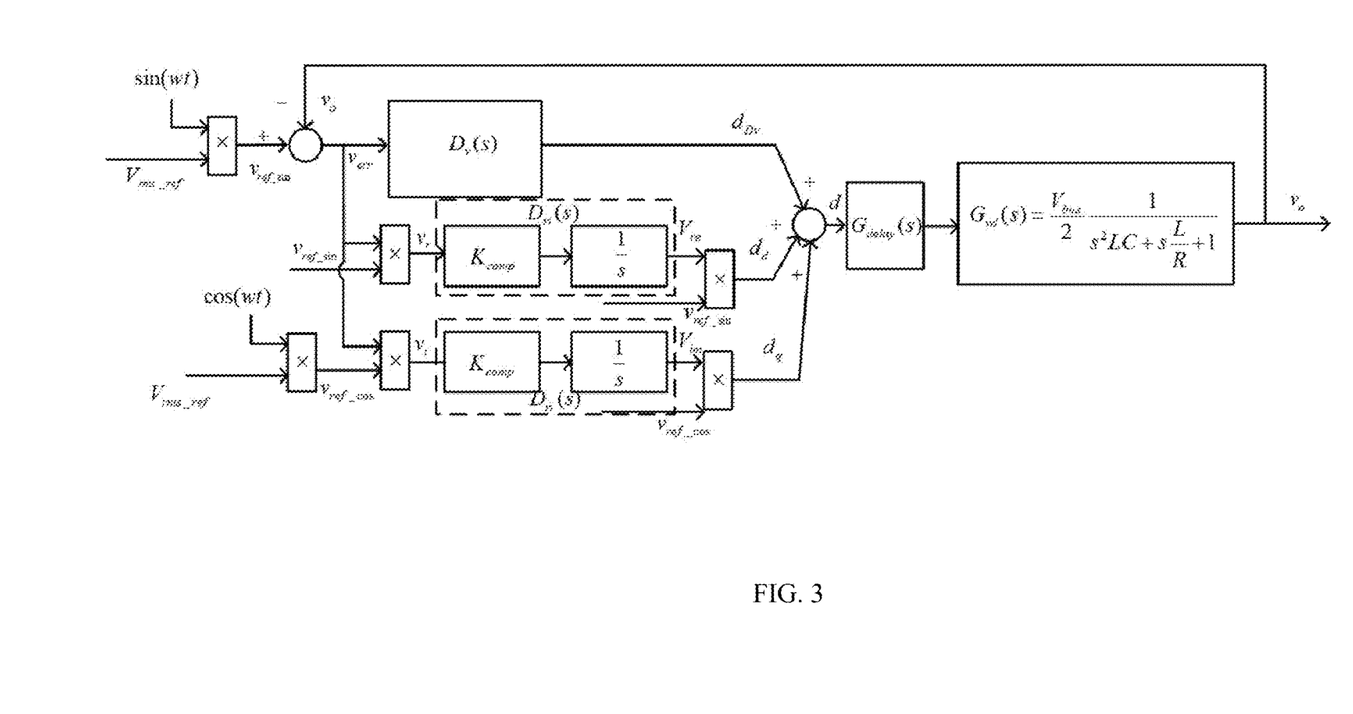
FIG. 3 shows a simplified inverter control system used for a three-phase four-wire inverter topology according to a first embodiment of the present invention.

Refer to a simplified inverter control system shown in FIG. 3. First, an inverter sine voltage given value $v_{ref\_sin}$ and an inverter cosine voltage given value $v_{ref\_cos}$ are obtained based on the given inverter voltage effective value $v_{rms\_ref}$, $$\begin{cases} v_{ref\_sin} = v_{rms\_ref} \sin(wt) \\ v_{ref\_cos} = v_{rms\_ref} \cos(wt) \end{cases},$$

where w is an angular frequency of the inverter output voltage, and t is time. Those skilled in the art know that a given value is also referred to as a reference value, that is, an expected value output by an inverter.

It is assumed that $v_o = V_{rms\_o} \sin(wt+\theta)$, where $v_o$ is the inverter output voltage (that is, a feedback voltage), $V_{rms\_o}$ is an effective value of the inverter output voltage, and $\theta$ is an initial phase angle of the inverter voltage. In the present invention, for ease of control, it is required that $\theta=0$.

In this case, $$v_{err} = v_{ref\_sin} - v_o = V_{rms\_ref} \sin(wt) - V_{rms\_o} \sin(wt)$$
$$= \Delta V_{rms} \sin(wt),$$

where $v_{err}$ is a difference between the inverter sine voltage given value and the feedback voltage, and $\Delta V_{rms}$ is a difference between the given inverter voltage effective value and the feedback voltage effective value. In the field of circuit control, the feedback voltage is a sine value. Therefore, in the discussion of the present invention, a sine symbol is no longer labeled on a feedback signal.

$v_{err}$ including the feedback voltage $v_o$ is input into a multiplier respectively with the inverter sine voltage given value and the inverter cosine voltage given value to obtain a real-axis voltage $n_r$ and an imaginary-axis voltage $v_i$.

$$\begin{cases} v_r = v_{ref\_sin} \times v_{err} \\ v_i = v_{ref\_cos} \times v_{err} \end{cases} \quad (1)$$

Therefore, $$\begin{cases} v_r = V_{rms\_ref} \Delta V_{rms} \sin^2(wt) = V_{rms\_ref} \Delta V_{rms} \frac{1}{2}(1 - \cos(2wt)) \\ v_i = V_{rms\_ref} \Delta V_{rms} \sin(wt)\cos(wt) = V_{rms\_ref} \Delta V_{rms} \frac{1}{2}\sin(2wt) \end{cases} \quad (2)$$

The given inverter voltage effective value is normalized into a per-unit pu, that is, $V_{rms\_ref}=1$. Where pu represents a relative unit system, and is a common term in the field of engineering. For example, an inverter voltage standard value is 230 V, represented by 1 pu. In this case, (1+15%)*230 V is 1.15 pu.

In this case, Formula (2) may be simplified as:

$$\begin{cases} v_r = \Delta V_{rms} \sin^2(wt) = \Delta V_{rms} \frac{1}{2}(1 - \cos(2wt)) \\ v_i = \Delta V_{rms} \sin(wt)\cos(wt) = \Delta V_{rms} \frac{1}{2}\sin(2wt) \end{cases}$$

The real-axis voltage and the imaginary-axis voltage are further respectively represented as including a constant part (a direct current amount) and a disturbance part (an alternating current amount):

$$\begin{cases} v_r = V_r + \hat{v}_r \\ v_i = V_i + \hat{v}_i \end{cases} \quad (3)$$

where $V_r$ is a real-axis voltage average value, $V_i$ is an imaginary-axis voltage average value, $\hat{v}_r$ is a real-axis voltage disturbance value, and $\hat{v}_i$ is an imaginary-axis voltage disturbance value.

Real-axis part:

$$\begin{cases} V_r = \frac{1}{2}\Delta V_{rms} \\ \hat{v}_r = -\frac{1}{2}\Delta V_{rms}\cos(2wt) \end{cases} \quad (4)$$

and

Imaginary-axis part:

$$\begin{cases} V_i = 0 \\ \hat{v}_i = -\frac{1}{2}\Delta V_{rms}\sin(2wt) \end{cases} \quad (5)$$

According to the foregoing derivation, a real-axis voltage and an imaginary-axis voltage of a two-phase rotating coordinate system of a three-phase inverter are obtained, and the real-axis voltage and the imaginary-axis voltage are respectively written in a form including a direct current amount and an alternating current amount.

Compensation control is further performed on the real-axis voltage and the imaginary-axis voltage. Starting from decompositions (3), (4), and (5), an integral compensator (also referred to as an integral controller)

$$D_{ri}(s) = K_{comp}\frac{1}{s}$$

is added. In the present invention, $D_{ri}(s)$ is an effective value voltage controller configured to control a real-axis voltage and an imaginary-axis voltage, and is referred to as an "equivalent effective value voltage controller" in the present invention to differentiate from a conventional effective value voltage controller. $K_{comp}$ is a gain coefficient of the controller, 1/s is an integral part of the controller, and s is a frequency domain operator.

In this case, $$\begin{cases} V_{re} = \left(K_{comp}\frac{1}{s}\right) \times v_r \\ V_{im} = \left(K_{comp}\frac{1}{s}\right) \times v_i \end{cases} \quad (6)$$

where $V_{re}$ is a controller real-axis output value, and $V_{im}$ is a controller imaginary-axis output value.

Formula (3) is substituted into Formula (6), $$\begin{cases} V_{re} = \left(K_{comp}\frac{1}{s}\right) \times (V_r + \hat{v}_r) \\ V_{im} = \left(K_{comp}\frac{1}{s}\right) \times (V_i + \hat{v}_i) \end{cases}$$

It is known that $$\begin{cases} \left|\hat{v}_r \times \left(K_{comp}\frac{1}{s}\right)\right| = \left|\frac{K_{comp}}{2}LV_{rms}\frac{1}{2\omega}\sin(2wt)\right| \ll 1; \\ \left|\hat{v}_i \times \left(K_{comp}\frac{1}{s}\right)\right| = \left|\frac{K_{comp}}{2}LV_{rms}\frac{1}{2\omega}\sin(2wt)\right| \ll 1; \end{cases} \quad (7)$$
$(K_{comp} < 1).$ Therefore, the disturbance part is omitted to obtain $$\begin{cases} V_{re} \approx \left(K_{comp}\dfrac{1}{s}\right)V_r = \left(K_{comp}\dfrac{1}{s}\right)\dfrac{1}{2}\Delta V_{rms} \\ V_{im} \approx \left(K_{comp}\dfrac{1}{s}\right)V_i = 0 \end{cases} \quad (8)$$

As can be seen from Formula (8), in this embodiment, an inverter voltage effective value after orthogonal decomposition includes a real part $V_{re}$ and an imaginary part $V_{im}$ equal to zero, which is equivalent to an instantaneous effective value voltage control system. Therefore, the foregoing derivation process is proved to be accurate and reasonable.

Continue to refer to the simplified inverter control system shown in FIG. 3. An instantaneous value of the inverter output voltage is controlled by the instantaneous value voltage controller $D_v(s)$. $d_{Dv}$ is a duty cycle of an output of the instantaneous value voltage controller, $d_d$ is a duty cycle of an output of an equivalent real-axis voltage loop, $d_q$ is a duty cycle of an output of an equivalent imaginary-axis voltage loop, $G_{delay}(S)$ is a digitally controlled delay stage transfer function, $G_{vd}(s)$ is a controlled object transfer function of the voltage loop, that is, a mathematical control formula obtained through a Laplace transform of hardware of the three-phase inverter, $V_{bus}$ is a voltage of a bus capacitor, L is an inverter filter inductor, C is an inverter filter capacitor, R is an equivalent resistance value of a load. When a controlled object (an inverter topology) has different parameters, transfer functions are different. A total duty cycle d is used to obtain the inverter output voltage through the delay stage transfer function and the controlled object transfer function.

In the case of normalization.

$$\begin{cases} v_{ref\_sin} = 1pu \times \sin(wt) \\ v_{ref\_cos} = 1pu \times \cos(wt) \end{cases}.$$

Based on this, the duty cycle of the equivalent real-axis voltage loop output and the duty cycle of the equivalent imaginary-axis voltage loop output may be further obtained.

$$\begin{cases} d_d = V_{re} \times v_{ref\_sin} = v_{re}\sin(wt) \\ d_q = V_{im} \times v_{ref\_cos} = v_{im}\cos(wt) \approx 0 \end{cases}.$$

It is known that $D_{ri}(s)=K_{comp}1/s$, which represents an equivalent effective value voltage controller in the present invention. An effective value error $\Delta V_{rms}$ may be quickly calculated. A calculation period is a control period $T_s$, for example $$T_s = \dfrac{1}{f_s} = \dfrac{1}{18000}$$

here. Therefore, an output $V_{re}$ of the controller may quickly reach a reference value $V_{rms\_ref}$, that is, $V_{re} \approx V_{rms\_ref}$. A conventional calculation period of the effective value error is a utility power period $T_o$, for example, for utility power 50 Hz/20 ms, $$T_o = \dfrac{1}{f_o} = \dfrac{1}{50}.$$

Therefore, a bandwidth (that is, a crossover frequency $f_{c\_new}$) of the equivalent effective value voltage controller in the present invention may be configured to be much greater than a crossover frequency $f_{c\_ori}$ of a conventional effective value voltage controller. For example, the crossover frequency of the equivalent effective value voltage controller in the present invention is $$f_{c\_new} \approx \dfrac{1}{10}f_s = 1800 \text{ Hz},$$

and the crossover frequency of the conventional effective value voltage controller is $$f_{c\_ori} \approx \left(\dfrac{1}{10} \sim \dfrac{1}{5}\right)f_o = (5 \sim 10 \text{ Hz}).$$

This means that a regulating speed of the equivalent effective value voltage controller in the present invention is greater than that of a conventional control method. In addition, with the presence of an integral stage, there is almost no steady state error in the control method of the present invention.

The entire inverter control system in this embodiment is equivalent to a voltage inner-outer loop system. The inner loop is a voltage instantaneous value open-loop system, and the outer loop is a voltage effective value closed-loop system. The instantaneous value voltage controller $D_v(s)$ can ensure the convergence of an initial state of the system and improve the dynamic state of the system. An imaginary-axis branch in the voltage effective value closed-loop system can ensure that an initial phase angle θ of the inverter voltage is zero. In a steady state of the system, $\Delta V_{rms} \approx 0$, $d_d \approx V_{rms\_ref}\sin(wt)$, and $d_q \approx 0$. A total duty cycle $d=d_{Dv}+d_d+d_q \approx d_d$, that is, $d_{Dv} \approx 0$. Therefore, the instantaneous value voltage controller $D_v(s)$ accounts for a very small weight ratio in the steady state.

Figure 4:
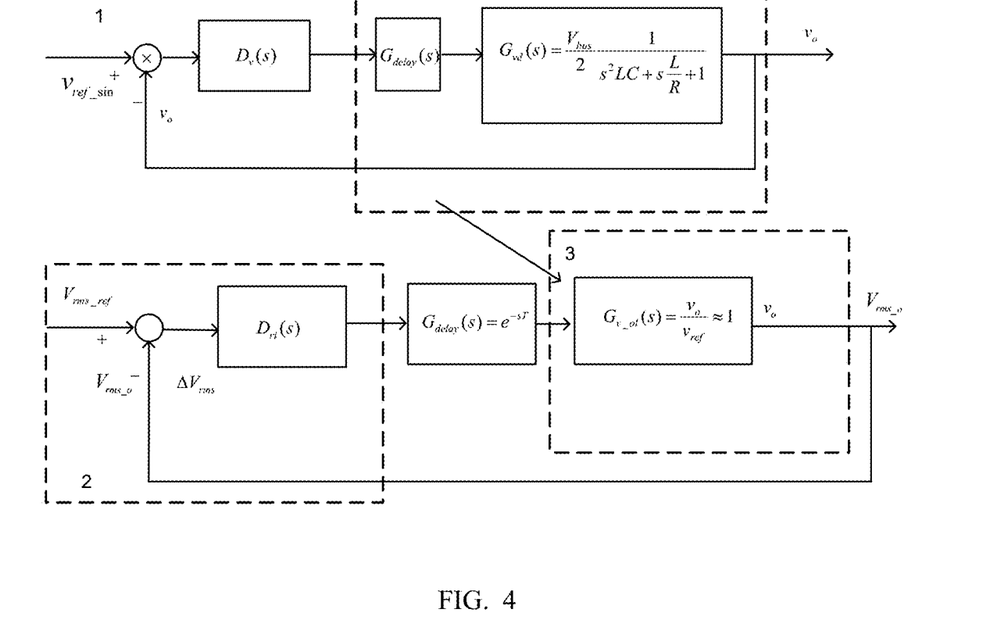
FIG. 4 shows an equivalent inverter control system according to the first embodiment of the present invention.

Refer to an equivalent inverter control system shown in FIG. 4, which clearly shows the voltage inner-outer loop system. The inner loop is an equivalent instantaneous value voltage open loop 3 which is equivalent to an instantaneous value voltage loop 1, and the outer loop is an equivalent voltage effective value closed loop 2. $V_{rms\_o}$ is an effective value of the inverter output voltage, $e^{-sT}$ is a delay stage transfer function, and $G_{v\_oi}(s)$ is a transfer function for making the instantaneous value voltage loop 1 equivalent to the instantaneous value voltage open loop 3.

The equivalent effective value voltage loop is specifically analyzed below with reference to FIG. 4. A controller is $$D_{ri}(s) = K_{comp}\dfrac{1}{s},$$

and a controlled object is $G_{delay}(s)=e^{-sT}$, where $$T = \dfrac{1}{17 \text{ kHz}}.$$

Pade equivalent linearization is performed, and a controller is designed. In the open loop and closed loop of the system:

an equivalent voltage effective value open-loop transfer function is:

$$G_{rms\_oi}(s) = D_{ri}(s)G_{delay}(s), \text{ and}$$

an equivalent voltage effective value closed-loop transfer function is:

$$G_{rms\_ci}(s) = \frac{D_{ri}(s)G_{delay}(s)}{1 + D_{ri}(s)G_{delay}(s)}.$$

An appropriate PM/GM is set to obtain a parameter $K_{comp}$. PM stands for a phase margin, and GM stands for a gain margin. It should be noted that $D_{ri}$ must be an integral controller.

Figure 5:
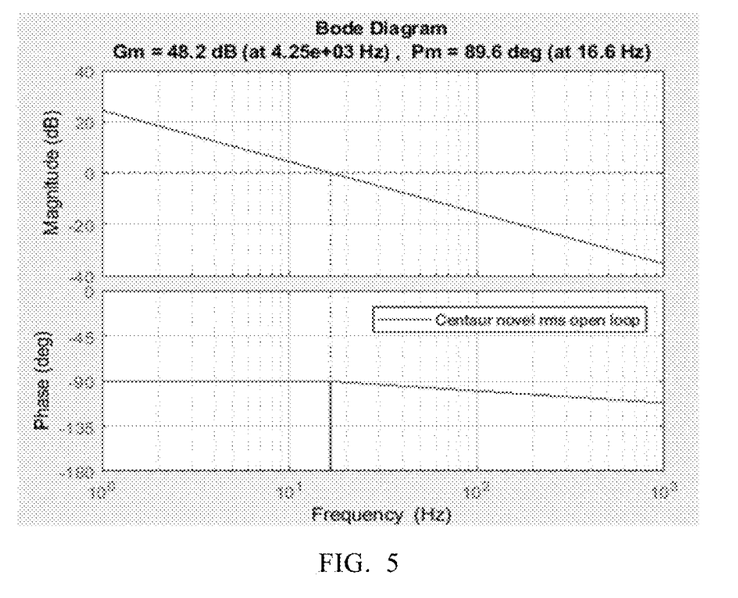
FIG. 5 is an open-loop Bode diagram of an equivalent effective value voltage loop according to the first embodiment of the present invention.

Refer to an open-loop Bode diagram of the equivalent effective value voltage loop in FIG. 5. A loop crossover frequency is $f_{c\_ri}$=16.6 Hz, a phase margin is $PM_{ri}$=89.6 deg, and a gain margin is $GM_{ri}$=48.2 dB. In the field of inverter control, it is usually required that GM>6 and PM>30. Therefore, the design in this embodiment can meet the performance requirement.

Figure 6:
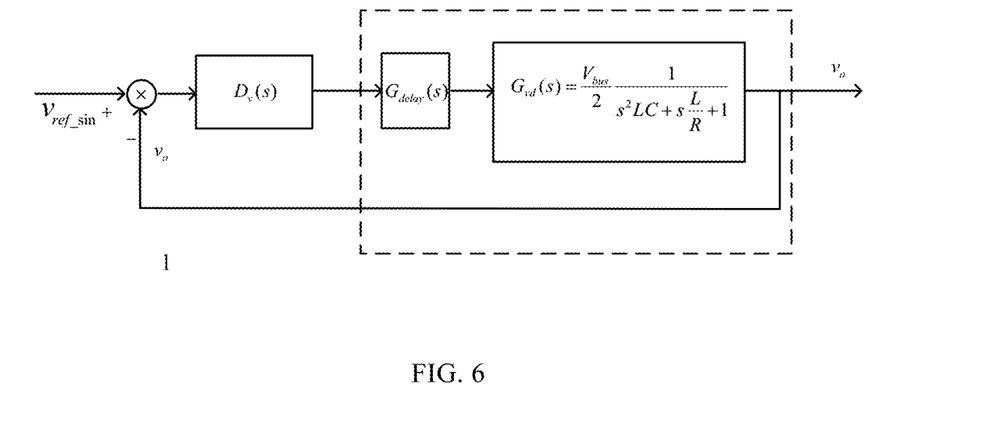
FIG. 6 shows an instantaneous value voltage loop in FIG. 4.

The instantaneous value voltage loop in FIG. 4 is then discussed below. For clarity FIG. 6 specially shows an instantaneous value voltage loop 1 in FIG. 4.

$$D_v(s) = K_{fv}\frac{s+z}{s+p}$$

is selected exemplarily but not restrictively, representing a hysteresis controller. $K_{fv}$ is a gain coefficient of the instantaneous value voltage loop controller, z is a zero point of an instantaneous value voltage loop controller, p is a pole of the instantaneous voltage loop controller, and s is the frequency domain operator. In the present invention, the other types of controllers well known in the field may be selected as the instantaneous value voltage loop controller, as long as they can ensure the convergence of an initial state of the system and account for a very small weight ratio in a steady state.

Figure 7:
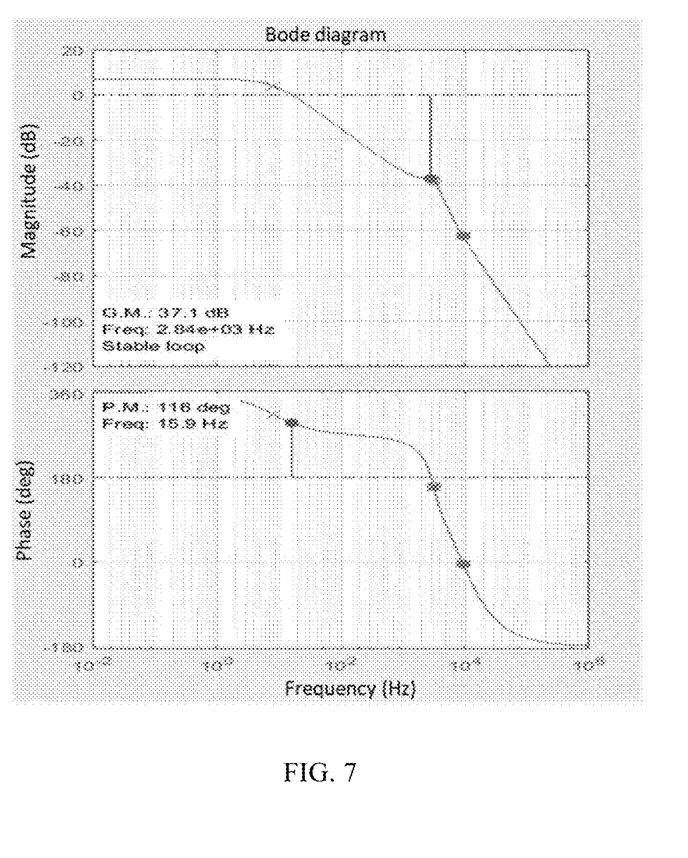
FIG. 7 is an open-loop Bode diagram of the instantaneous value voltage loop in FIG. 4.

Refer to an open-loop Bode diagram of the instantaneous value voltage loop in FIG. 7. A crossover frequency is $f_{c\_v}$=15.9 Hz, a phase margin is $PM_v$=116 deg, and a gain margin is $GM_v$=37.1 dB. The instantaneous value voltage loop accounts for a relatively small weight ratio, and is approximately 0 in a steady state. Therefore, the crossover frequency may be configured to be relatively small. A crossover frequency of a conventional instantaneous value voltage controller is usually greater than 100 Hz. Therefore, the crossover frequency of the instantaneous value voltage loop in the present invention is clearly lower than that in conventional standards.

Second Embodiment

Figure 8:
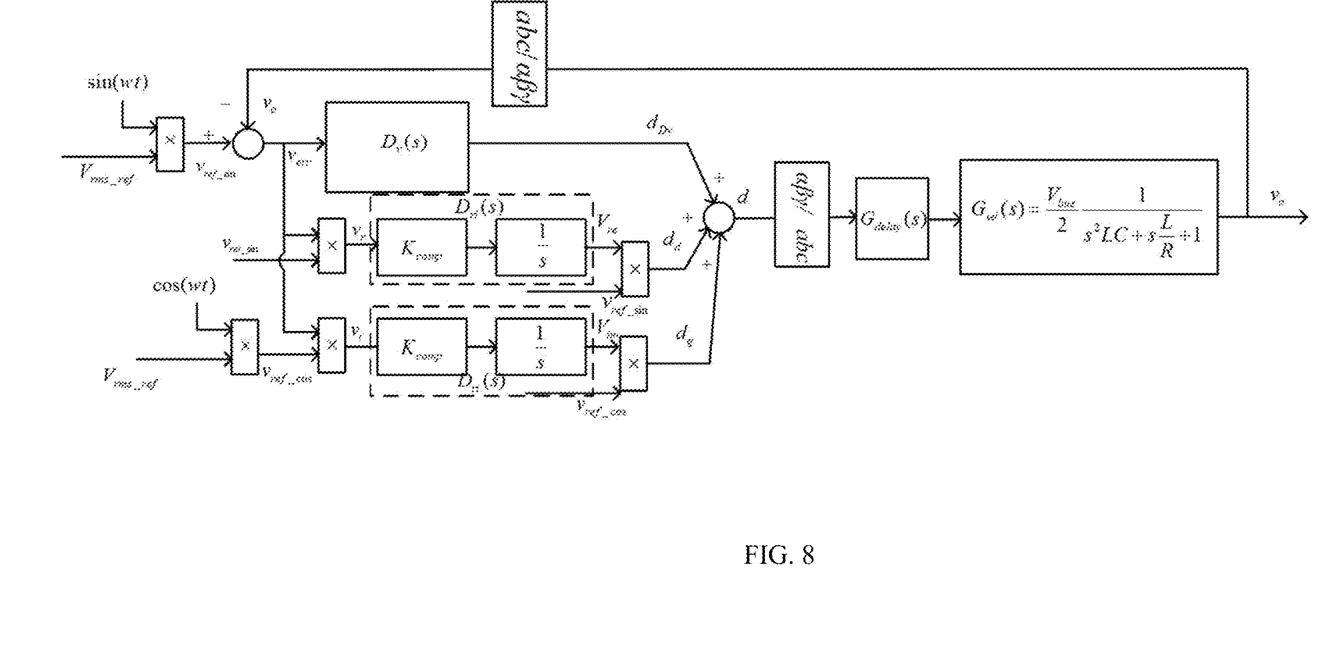
FIG. 8 shows a simplified inverter control system used for a three-phase three-wire inverter topology according to a second embodiment of the present invention.

In this embodiment, an inverter control system for the three-phase three-wire inverter topology shown in FIG. 2 is provided. FIG. 8 is a simplified schematic diagram of a three-phase control system of a three-phase three-wire inverter. A coordinate system conversion part is added based on the control system shown in FIG. 3, wherein, abc/αβγ represents a conversion part from an abc coordinate system into an αβγ coordinate system, and αβλ/abc represents an inverse conversion part from the αβγ coordinate system into the abc coordinate system. In the electrical field, a three-phase system has a three-phase abc static coordinate system and a three-phase αβγ static coordinate system and further has a two-phase rotating coordinate system dqo. After coordinate system conversion, inverter voltages $V_{inv\_\alpha}$ and $V_{in\_\beta}$ of inverter controlled objects are still controlled by sine and cosine fundamental waves. For controllers of the control system, an instantaneous value voltage controller $D_v(s)$ and an equivalent effective value voltage controller $D_{ri}(s)$ are still used. The inverter voltage $V_{inv\_\gamma}$ is controlled by a $3^{rd}$ harmonic. The $3^{rd}$ harmonic is injected to improve the utilization of a DC voltage.

The inventors prove the effects of the present invention through the results of simulation and test under hardware-in-the loop (HIL), respectively.

Figure 9A:
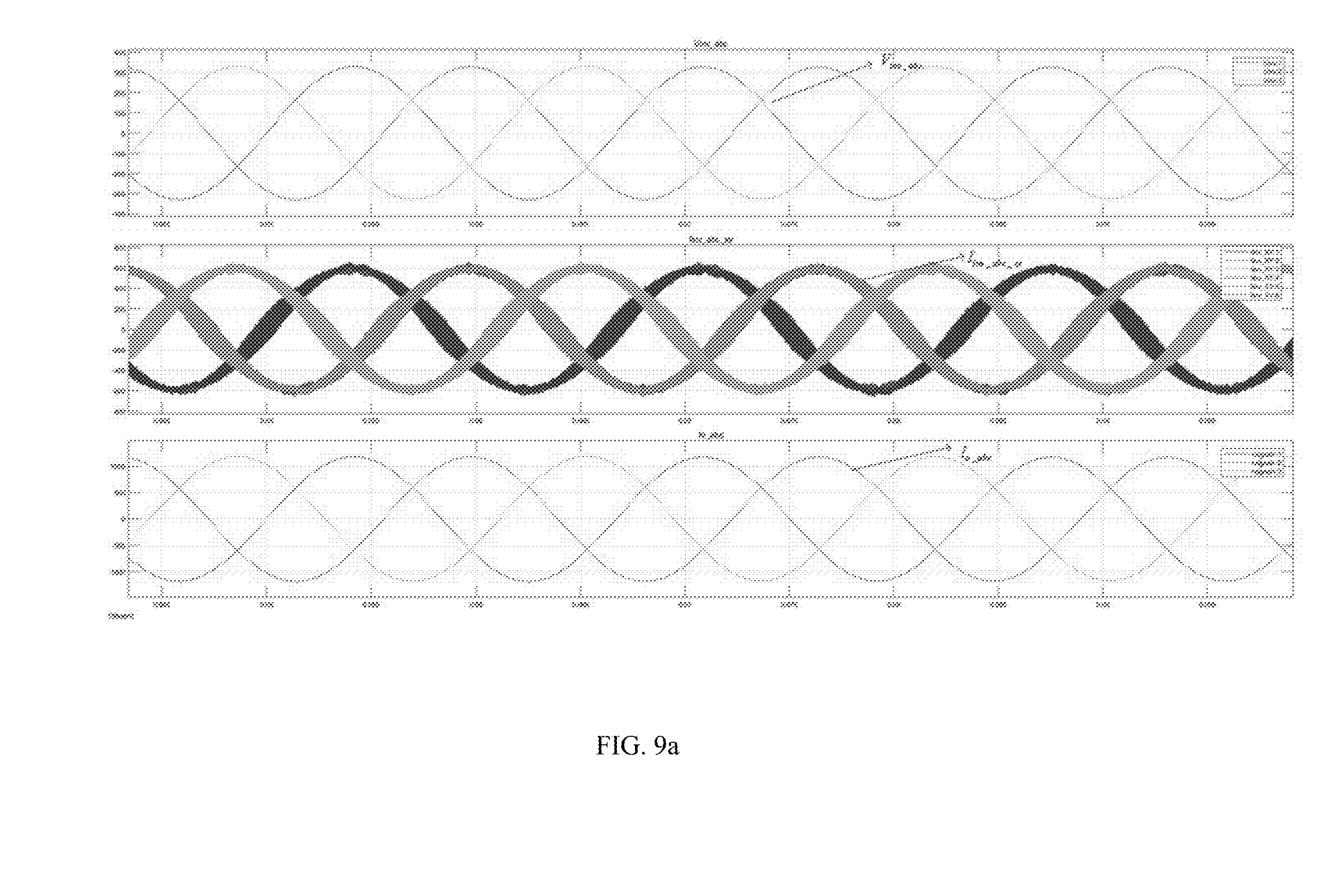
FIG. 9a and FIG. 9b show simulation results.
Figure 9B:
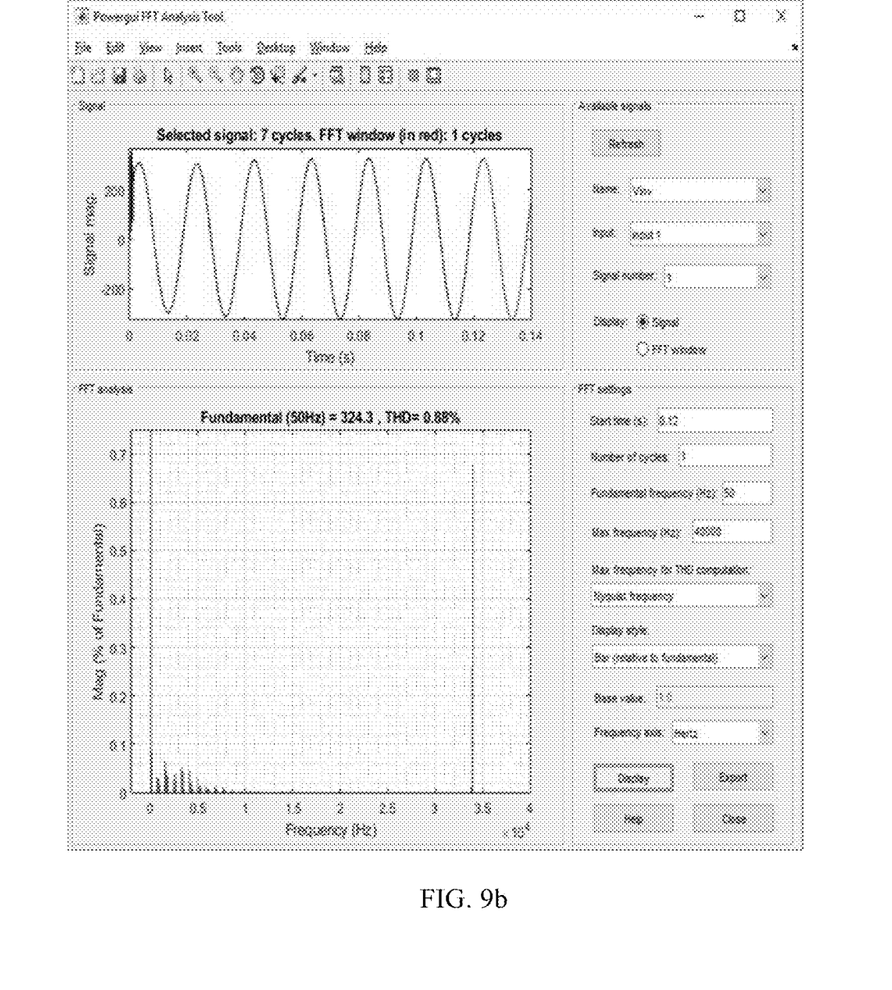

Refer to the results of simulation shown in FIG. 9a and FIG. 9b. FIG. 9a shows an inverter phase abc voltage $V_{inv\_abc}$, an phase abc inductor current $I_{inv\_abc\_xy}$ of inverter bridge arms x and y, and an output phase abc current $I_{o\_abc}$ in a full-load steady state sequentially from top to bottom. The signals are normal, and there is almost no net difference. FIG. 9b shows harmonic data of phase a of an inverter voltage in the full-load steady state, wherein a total distortion rate of a voltage harmonic is THDv=0.88%, satisfying the requirement of steady-state performance of products. Those skilled in the art can understand that phases b and c have similar harmonic data.

Figure 10A:
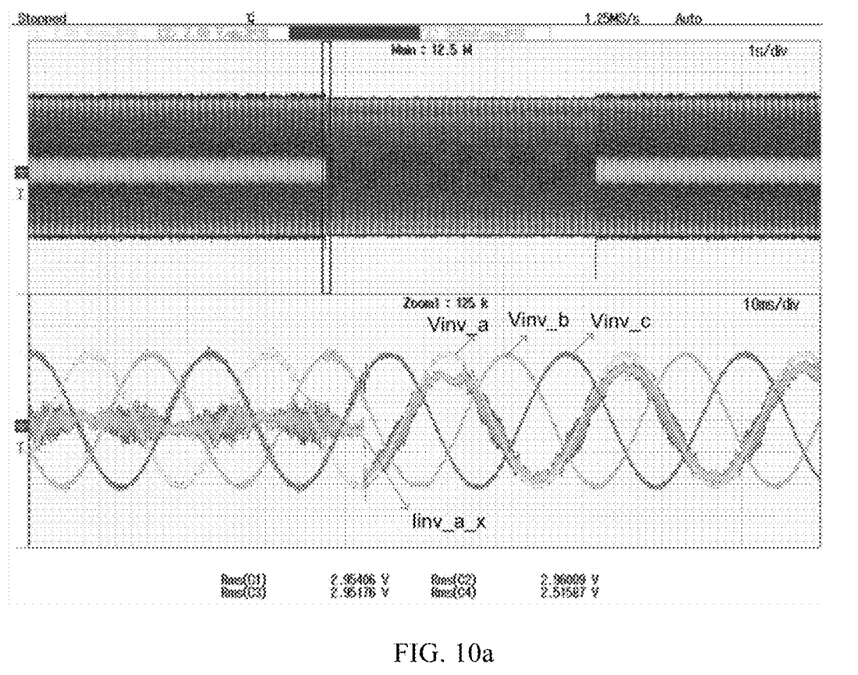
FIG. 10a and FIG. 10b show results of test under hardware-in-the-loop (HIL).
Figure 10B:
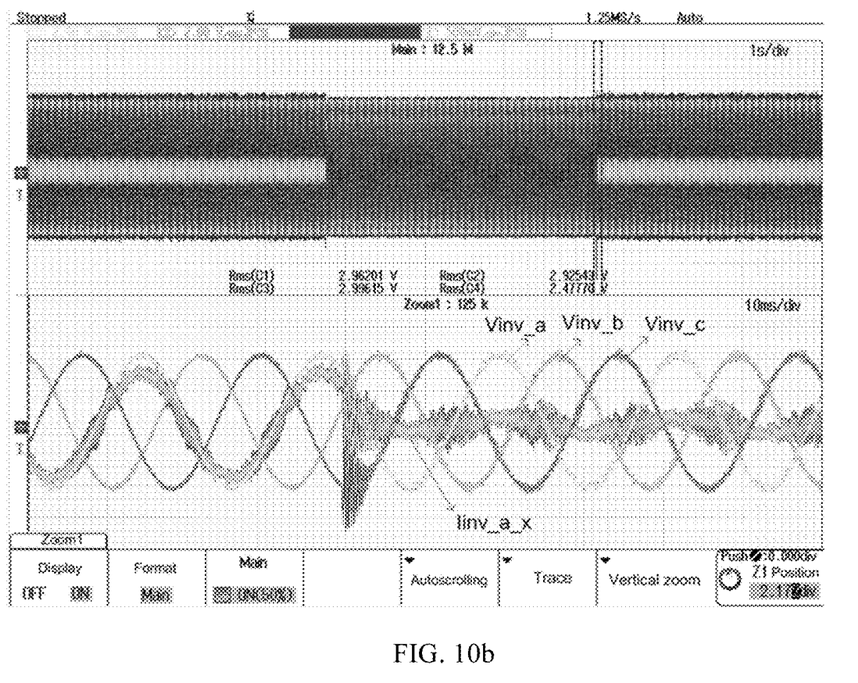

Refer to the results of test under HILg shown in FIG. 10a and FIG. 10b. FIG. 10a shows an instantaneous process of the load from 0% to 100%, an inverter phase abc voltage $V_{inv\_abc}$, and a phase a inductor current $I_{inv\_a\_x}$ of an inverter bridge arm x. In a loading process, the signals are stable. A dynamic state period is approximately less than one utility power period of 20 ms. FIG. 10b shows an unloading process of the load from 100% to 0%. The results show that the inverter voltage and the current are both stable, and the period of the dynamic state process is less than that of a utility power. Therefore, the inverter is stable with dynamic load, and the dynamic state performance and the steady state net difference satisfy requirements.

In summary, the present invention provides a novel orthogonal decomposition method for an inverter voltage, which comprises: obtaining a real-axis voltage and an imaginary-axis voltage, decomposing the real-axis voltage to obtain a direct current amount and a disturbance amount by means of a small signal analysis method, and similarly obtaining a direct current amount and a disturbance amount of the imaginary-axis voltage. Based on the novel orthogonal decomposition method for a voltage, a novel inverter voltage controller is designed, which includes an equivalent effective value voltage controller and an instantaneous value voltage controller. In a three-phase inverter, a complete novel three-phase inverter control system is designed. Compared with a conventional inverter control system, the novel system has much better dynamic state performance and steady state performance than the conventional system in terms of effective value voltage control. In addition, the instantaneous value voltage control loop is equivalent to an open-loop system, so as to ensure that the application to an inverter parallel system has comparable performance.

One of the effects of the inverter control system of the present invention lies in that compared with a conventional control system, in an equivalent effective value voltage control loop, a relatively large crossover frequency can be designed, so that sufficiently fast regulating speed is ensured, and there are still sufficient phase and amplitude margins. In addition, an integral controller part in the system ensures stability and almost has no net difference, thereby providing excellent performance in dynamic status/stability.

Although the present invention has been described by way of preferred embodiments, the present invention is not limited to the embodiments described herein, but includes various changes as well as variations made without departing from the scope of the present invention.

The invention claimed is:

1. A control system for a three-phase inverter, comprising an instantaneous value voltage controller and an equivalent effective value voltage controller, wherein the instantaneous value voltage controller is configured to feed back and control an instantaneous value of an inverter output voltage, the equivalent effective value voltage controller is configured to perform an orthogonal decomposition feedback control on an effective value of the inverter output voltage, and wherein the equivalent effective value voltage controller is configured to perform integral compensation respectively on a real-axis voltage and an imaginary-axis voltage of a two-phase rotating coordinate system of the three-phase inverter, and an output of the instantaneous value voltage controller and an output of the equivalent effective value voltage controller are used to obtain the inverter output voltage through a delay stage transfer function and a controlled object transfer function, wherein the equivalent effective value voltage controller is an integral compensator $D_{ri}(s)=K_{comp}\frac{1}{s}$, where $K_{comp}$ is a gain coefficient, and s is a frequency domain operator.

2. The control system of claim 1, wherein the gain coefficient is less than 1.

3. The control system of claim 2, wherein the real-axis voltage is represented as $v_r$, and the imaginary-axis voltage is represented as $v_i$, wherein $$\begin{cases} v_r = v_{ref\_sin} \times v_{err} \\ v_i = v_{ref\_cos} \times v_{err} \end{cases},$$

where $v_{ref\_sin}$ represents an inverter sine voltage given value, $v_{ref\_cos}$ represents an inverter cosine voltage given value, and $v_{err}$ represents a difference between the inverter sine voltage given value and the inverter output voltage.

4. The control system of claim 3, wherein $$\begin{cases} v_r = V_r + \hat{v}_r \\ v_i = V_i + \hat{v}_i \end{cases},$$

where $V_r$ is a real-axis voltage average value, $V_i$ is an imaginary-axis voltage average value, $\hat{v}_r$ is a real-axis voltage disturbance value, and $\hat{v}_i$ is an imaginary-axis voltage disturbance value.

5. The control system of claim 4, wherein $$\begin{cases} V_r = \frac{1}{2}\Delta V_{rms} \\ \hat{v}_r = -\frac{1}{2}\Delta V_{rms}\cos(2wt) \end{cases},$$

and $$\begin{cases} V_i = 0 \\ \hat{v}_i = \frac{1}{2}\Delta V_{rms}\sin(2wt) \end{cases},$$

where $\Delta V_{rms}$ is a difference between a given inverter voltage effective value and a feedback voltage effective value, w is an angular frequency of the inverter output voltage, and t is time.

6. The control system of claim 5, wherein the integral compensator is configured to convert the real-axis voltage $v_r$ into a controller real-axis output value $V_{re}$, and convert the imaginary-axis voltage $v_i$ into a controller imaginary-axis output value $V_{im}$, wherein $$\begin{cases} V_{re} \approx \left(K_{comp}\frac{1}{s}\right)V_r = \left(K_{comp}\frac{1}{s}\right)\frac{1}{2}\Delta V_{rms} \\ V_{im} \approx \left(K_{comp}\frac{1}{s}\right)V_i = 0 \end{cases}.$$

7. The control system of claim 6, wherein a duty cycle $d_d$ of an output of an equivalent real-axis voltage loop is obtained based on the controller real-axis output value $V_{re}$, a duty cycle $d_q$ of an output of an equivalent imaginary-axis voltage loop is obtained based on the controller imaginary-axis output value $V_{im}$, a duty cycle of an output of the instantaneous value voltage controller $D_v(s)$ is $d_{Dv}$, and a total duty cycle is d, where $d=d_{Dv}+d_d+d_q$.

8. The control system of claim 7, wherein the total duty cycle d is used to obtain the inverter output voltage through the delay stage transfer function and the controlled object transfer function.

9. The control system of claim 1, further comprising a coordinate system conversion part which is configured to implement conversion between an abc coordinate system and an αβγ coordinate system.

10. A control system for a three-phase inverter, comprising an instantaneous value voltage controller and an equivalent effective value voltage controller, wherein the instantaneous value voltage controller is configured to feed back and control an instantaneous value of an inverter output voltage, the equivalent effective value voltage controller is configured to perform an orthogonal decomposition feedback control on an effective value of the inverter output voltage, and wherein the equivalent effective value voltage controller is configured to perform integral compensation respectively on a real-axis voltage and an imaginary-axis voltage of a two-phase rotating coordinate system of the three-phase inverter, and an output of the instantaneous value voltage controller and an output of the equivalent effective value voltage controller are used to obtain the inverter output voltage through a delay stage transfer function and a controlled object transfer function, wherein the instantaneous value voltage controller is a hysteresis controller and represented as $D_v(s)=K_{fv}s+z/s+p$, where $K_{fv}$ is a gain coefficient of the instantaneous value voltage controller, z is a zero point of an instantaneous voltage loop controller, p is a pole of the instantaneous voltage loop controller, and s is the frequency domain operator.

11. A control method for a three-phase inverter, comprising:
  a step of feeding back and controlling an instantaneous value of an inverter output voltage;
  a step of performing orthogonal decomposition feedback control on an effective value of the inverter output voltage, which comprises performing integral compensation on a real-axis voltage and an imaginary-axis voltage of a two-phase rotating coordinate system of the three-phase inverter; and an output of the step of feeding back and controlling the instantaneous value of the inverter output voltage and an output of the step of performing orthogonal decomposition feedback control on the effective value of the inverter output voltage are used to obtain the inverter output voltage through delay stage transfer and controlled object transfer, wherein the real-axis voltage is represented as $v_r$, and the imaginary-axis voltage is represented as $v_i$, wherein where $v_{ref\_sin}$ represents an inverter sine voltage given value, $v_{ref\_cos}$ represents an inverter cosine voltage given value, and $v_{err}$ represents a difference between the inverter sine voltage given value and the inverter output voltage.

12. The control method of claim 11, wherein a gain coefficient of the integral compensation is less than 1.

13. The control method of claim 11, further comprising converting an abc coordinate system into an αβγ coordinate system in a feedback process and converting the αβγ coordinate system into the abc coordinate system in an output process.

14. The control method of claim 11, further comprising a step of adjusting an initial phase angle of the inverter output voltage to zero.

\* \* \* \* \*

UNITED STATES PATENT AND TRADEMARK OFFICE
CERTIFICATE OF CORRECTION

PATENT NO. : 12,047,014 B2
APPLICATION NO. : 17/818544
DATED : July 23, 2024
INVENTOR(S) : Ning et al.

It is certified that error appears in the above-identified patent and that said Letters Patent is hereby corrected as shown below:

In the Claims

Column 11, Claim 1, Line 27:
Please correct "$D_{ri}(s) = K_{comp} \frac{1}{3}$" to read – $D_{ri}(s) = K_{comp} \frac{1}{s}$ –

Column 13, Claim 11, between Lines 9-10:
Please add – $\begin{cases} v_r = v_{ref\_sin} \times v_{err} \\ v_i = v_{ref\_cos} \times v_{err} \end{cases}$ –

Column 13, Claim 11, Line 10:
Please correct "$V_{ref sin}$" to read – $V_{ref\_sin}$ –

Column 13, Claim 11, Line 11:
Please correct "$V_{ref cos}$" to read – $V_{ref\_cos}$ –

Signed and Sealed this
Seventeenth Day of September, 2024

Katherine Kelly Vidal
*Director of the United States Patent and Trademark Office*